Patented June 26, 1951

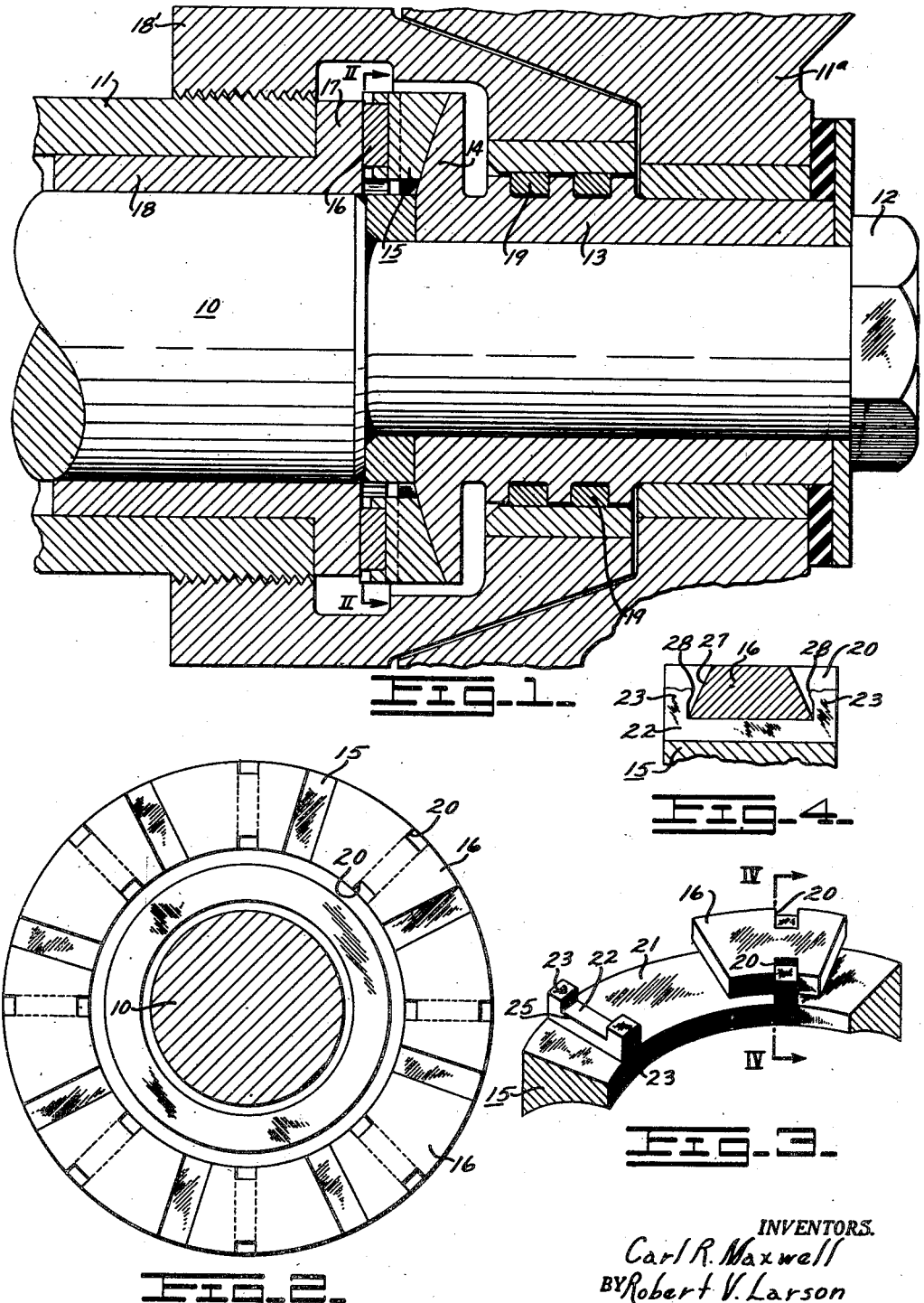

2,558,262

UNITED STATES PATENT OFFICE 2,558,262

THRUST BEARING

Carl R. Maxwell, Washington, and Robert V. Larson, Morton, Ill., assignors to Caterpillar Tractor Co., San Leandro, Calif., a corporation of California Application September 20, 1947, Serial No. 775,222

5 Claims. (Cl. 308—160)

This invention relates to thrust bearings of the Kingsbury type and particularly to improvements in such bearings which will enable them to be efficiently and precisely made even in very small sizes.

Kingsbury type thrust bearings are designed and employed for high speed and high thrust load operations because their flat slipper type bearing members afford more bearing contact than ball or roller type bearings and can, in fact, be operated with a film of oil between the bearing surfaces that are under load rather than in metal to metal contact. Such bearings require the making of small irregularly shaped parts with a high degree of manufacturing precision and have, therefore, been considered impractical to manufacture in smaller sizes.

It is an object of the present invention to provide a thrust bearing of the Kingsbury or slipper type that is capable of being easily and rapidly made and in which a high degree of accuracy of all critical parts is readily obtained. Further objects and advantages of the invention and the manner in which the invention is carried into practice are made apparent in the following specification wherein reference is made to the accompanying drawings.

In the drawings:

Fig. 1 is a central vertical section through a bearing embodying the present invention, and the parts with which it is associated;

Fig. 2 is a sectional view taken on the line II—II of Fig. 1;

Fig. 3 is a fragmentary perspective view of a portion of the bearing; and

Fig. 4 is an enlarged section taken on the line IV—IV of Fig. 3.

Referring first to Fig. 1, a bearing constructed in accordance with the present invention is shown in a typical assembly with which it might be used. This assembly comprises a non-rotating or dead shaft 10 about which a tubular shaft 11 rotates. The shaft 10 is fixed in a housing or the like, a portion of which is illustrated at 11a. A reduced end of the shaft 10 has a nut 12 secured thereto and carries a stationary collar 13 with a flanged end 14 preferably spherically ground on its face to form an adjustable seat for one race 15 of the bearing. The race 15 supports a plurality of bearing slippers 16 engageable in face to face contact with a second bearing race 17 formed as a flange on a tubular member 18 pressed into the end of the hollow shaft 11 but freely rotatable with relation to the dead shaft 10. Oil may be retained in the vicinity of the bearing by any suitable enclosure such as a thimble 18' threaded on to the end of the hollow shaft and extending beyond the bearing to embrace the bushing 13 on the dead shaft where suitable oil sealing rings, such as indicated at 19, may be provided.

The thrust action of the hollow shaft 11 which is in a right hand direction as viewed in Fig. 1 is absorbed by the slippers 16 and transmitted by them to the race 15 which is free to seek a properly aligned position by virtue of its spherical seat on the flange 14. The construction of the slippers 16 and the manner in which they are supported is best illustrated in Figs. 2 and 3 wherein each slipper is shown as comprising a small arcuate section of an annulus and provided with a pair of notches 20 oppositely disposed at its inner and outer edges. The annular bearing race 15 has a generally flat surface 21 provided with upstanding radially extending bars or supports 22 at equally spaced intervals. Posts 23 extend upwardly from the inner and outer edges of each of the supporting bars 22 and project into the notches 20 in the slippers to retain them in place and particularly to hold them against sliding movement toward and away from each other as the bearing race 17 rotates against them. The notches 20 are preferably formed nearer to one end of the slipper than the other so that it is unbalanced in its support and tends to rock about one edge 25 of the supporting surface of the bars 22. The longer end of the slipper is disposed as a leading edge in opposition to the direction of rotation of the race 17 so that it tends slightly to swing away from the race and, therefore, more readily includes beneath it a film of oil. Thus under proper operating conditions an oil film is at all times maintained between the bearing surfaces of the slipper 16 and the race 17.

It is essential to successful operation of a thrust bearing of this general type that each of the several slipper members 16 absorb its equal share of the thrust from the rotating race 17. Consequently, a high degree of accuracy in the formation of the slippers and the members which support them is required. This accuracy is difficult to obtain in previously known Kingsbury type bearings, particularly when the bearings are made in small sizes. The present construction greatly simplifies obtaining the required degree of accuracy. There are, for example, only three principal surfaces that are critical in obtaining the desired accuracy in the bearings herein illustrated. The first is the supporting surface of the bars 22 and the other two are the opposite faces of the slippers 16. Owing to the construction of the race 15 with which the bars 22 are integrally formed, the supporting surfaces of these bars may be accurately ground to a close tolerance by simple and practical machine operations, for example, by grinding while the race is being turned in a lathe or the like. The opposite faces of the slippers are easily made parallel and equally spaced by employing stock of uniform thickness and cutting the slippers therefrom by any suitable method such as die stamping. Thus, even though the parts are extremely small, all of the critical surfaces are easily accessible to precision machining operations. In fact, bearings constructed in accordance with the present invention have been made and proven satisfactory in service wherein the total outside diameter of the races does not exceed one and one-quarter inches.

As illustrated in Figs. 2 and 3, the slippers 16 are loosely supported upon the bars 22 and held in place only after assembly by contact of the rotating race 17 with the faces of the slippers. With this construction, some difficulty has been experienced in assembly and disassembly because of the tendency of the slippers to fall away from the race 15. This has been overcome by the construction illustrated in Fig. 4 wherein the notches 20 of the slippers are shown as inclined inwardly at their inner edges shown at 27. After the slipper is placed on the supporting bar 22 the posts 23 are deformed inwardly at their upper inner corners indicated at 28 as by a suitable center punching or staking operation so that they provide an obstruction cooperating with the wedge-like construction of the slipper 16 between the notches 20 and, thus, prevent it from falling away from its proper position on the bar 22.

We claim:

1. A thrust bearing of the kind including opposed races and slippers carried by one race for absorbing thrust from the other race comprising a plurality of radially extending bars formed integrally with and supported throughout their length upon said one race, slippers supported for rocking movement on said bars, and interlocking means between the slippers and bars to retain the slippers in spaced relation to each other.

2. A thrust bearing of the kind including opposed races and slippers carried by one race for absorbing thrust from the other race comprising a plurality of radially extending bars formed integrally with and supported throughout their length upon said one race, slippers supported for rocking movement on said bars, each slipper comprising a flat member with opposed notches in its edges, and posts at opposite ends of the bars registering with said notches to retain the slippers on said bars while the bearing is in use.

3. A thrust bearing of the kind including opposed races and slippers carried by one race for absorbing thrust from the other race comprising a plurality of radially extending bars on said one race, slippers supported for rocking movement on said bars, each slipper comprising a flat member with opposed notches in its edges, posts at opposite ends of the bars registering with said notches to retain the slippers on said bars while the bearing is in use, and deformed portions on said posts to form an interlocking connection with said notches.

4. In a slipper type thrust bearing, opposed annular bearing races, radially extending circumferentially spaced bars projecting outwardly from the face of one race and presenting co-planar supporting faces, posts at opposite ends of each bar projecting outwardly beyond their co-planar faces, bearing slippers supported one on each bar for thrust engagement with the other race, each slipper comprising a flat plate with parallel plane surfaces and having notches formed in its opposite edges for reception of said posts.

5. In a slipper type thrust bearing, opposed annular bearing races, radially extending circumferentially spaced bars projecting outwardly from the face of one race and presenting co-planar supporting faces, posts at opposite ends of each bar projecting outwardly beyond their co-planar faces, bearing slippers supported one on each bar for thrust engagement with the other race, each slipper comprising a flat plate with parallel plane surfaces and having notches formed in its opposite edges for reception of said posts, said notches having inclined edges and said posts having portions extending over said inclined edges to provide a loose but interlocking connection with the slippers.

CARL R. MAXWELL.
ROBERT V. LARSON.

REFERENCES CITED

The following references are of record in the file of this patent:

UNITED STATES PATENTS

| Number | Name | Date |
|---|---|---|
| 1,920,727 | Wallgren | Aug. 1, 1933 |
| 2,037,326 | Howarth | Apr. 14, 1936 |

FOREIGN PATENTS

| Number | Country | Date |
|---|---|---|
| 77,422 | Sweden | Jan. 12, 1920 |